CLASS
DIVISION
James H. Garfield
2-3-1836
X or Echelon Cultivator
Patented Apr. 3. 1836.
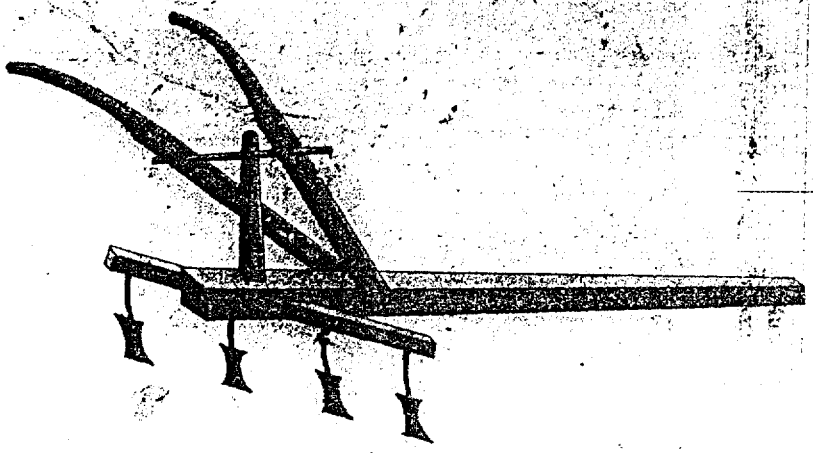
No 4.
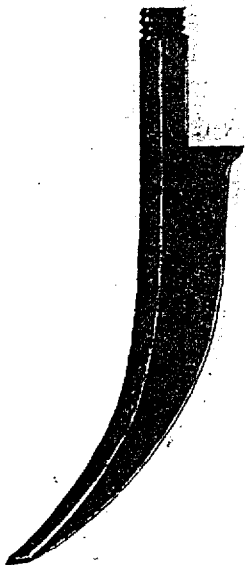
No 3.
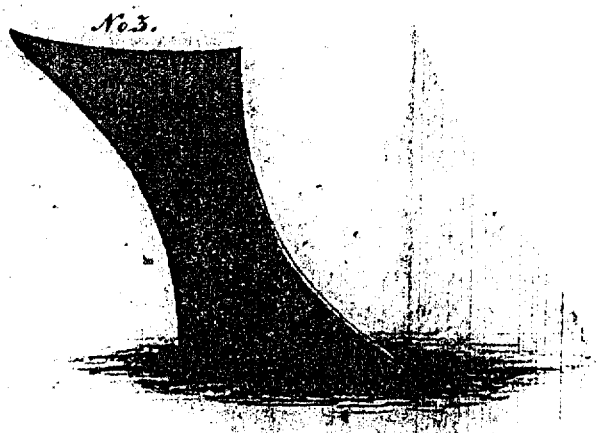

Feb. 3. 1836 21

9346X

James M. Garnett County of Essex Virginia

Letters Patent.

The schedule referred to in these Letters Patent and making part of the same, containing a description in the words of the said James M. Garnett, himself of his improvement in the Cultivator To all to whom these presents shall come Be it known that I James M. Garnett in the County of Essex and State of Virginia, have invented a new and useful improvement in the [illegible], or Echelon cultivator, & that the following is a full and exact description thereof —

It consists of a curved cast iron, marked No. 3 in the accompanying drawings having in the underside 2 dovetail grooves which the wrought Iron marked No. 4 is made to fit, so that when one point wears out the other may be turned. Four of these are fixed in a bar of wood fastened diagonally at an angle of 45°, to a straight beam of the length and size of a common plough beam for a single horse.

What I claim as my own invention is the form and fixing of the cast iron No. 3,

Witnesses

Robt. Hove
S. B. Gray

James M. Garnett.

198 nds

Drawing

* Additional improvement added, 13th October 1838.